United States Patent [19]
Robertson et al.

[11] Patent Number: 5,851,301
[45] Date of Patent: Dec. 22, 1998

[54] METHODS FOR SEPARATION OF WHEAT FLOUR INTO PROTEIN AND STARCH FRACTIONS

[75] Inventors: George H. Robertson, Danville; Trung K. Cao, Santa Clara, both of Calif.

[73] Assignee: The United States of America as represented by the Secretary of Agriculture, Washington, D.C.

[21] Appl. No.: 879,560

[22] Filed: Jun. 20, 1997

[51] Int. Cl.$^6$ .................................................. C08B 30/021
[52] U.S. Cl. ........................... 127/67; 530/424; 530/374; 106/125.1; 106/126.1; 106/132.1
[58] Field of Search .............................. 127/67; 530/424, 530/374; 106/126.1, 132.1, 125.1

[56] References Cited

U.S. PATENT DOCUMENTS

| | | | |
|---|---|---|---|
| 3,951,938 | 4/1976 | Kerkkonen et al. | 260/112 |
| 5,439,526 | 8/1995 | Czuchajowska et al. | 127/67 |
| 5,472,511 | 12/1995 | Rayas et al. | 127/67 |
| 5,605,577 | 2/1997 | Rayas et al. | 127/67 |

OTHER PUBLICATIONS

B. Gordon et al., "A Small Scale Device for Wheat Gluten Separation" In: Qual. Plant Foods Hum. Nutr. 33:161–168 (1983) no month avail.

D.A. Fellers, "Fractionation of Wheat into Major Components" In: Industrial Uses of Cereals, editor: Ed Y. Pomeranz, American Assoc. of Cereal Chemists, St. Paul, MN, pp. 207–228 (1973) no month avail.

G. Grace, "Preparation of Vital Wheat Gluten", In: Proceeding of the World Congress on Vegetable Protein Utilization in Human Foods and Animal Feedstuffs, editor: T.H. Applewhite, American Oil Chemists' Society, Champaign, IL pp. 112–115 (1989) no month avail.

R.A. Anderson et al., "Continuous Batter Process for Separating Gluten from Wheat Flour" In: Cereal Chemistry 35:449–457 (1958) no month avail.

R.A. Anderson et al., "Pilot–Plant Studies on the Continuous Batter Process to Recover Gluten From Wheat Flour" In: Cereal Chemistry 37:180–188 (1960) no month avail.

J.W. Finley, "Density Separation of Protein and Carbohydrates in Nonaqueous Solvent System" In: Journal of Food Science 41:882–885 (1976) no month avail.

Z. Czuchajowska et al., "Protein Concentrates and Prime Starch from Wheat Flours" In: Cereal Chemistry 70:701–706 (1993) no month avail.

P. Meredith, "On the Solubility of Gliadinlike Proteins, I Solubility in Nonaqueous Media" In: Cereal Chemistry, editor: K. A. Giles 42:54–63 no date avail.

*Primary Examiner*—David Brunsman
*Attorney, Agent, or Firm*—M. Howard Silverstein; John D. Fado; Margaret A. Connor

[57] ABSTRACT

Methods for separation of wheat flour into protein and starch fractions are described. Wheat flour is (1) mixed with water to hydrate the flour and form a cohesive batter or dough, (2) chilled, and (3) mixed and washed with chilled ethanol to separate it into protein and starch fractions. Wheat protein fractions that are equivalent in yield and protein concentration to fractions produced by water washing methods are obtained, while reducing water and energy use. The protein fraction showed improved dough strength.

16 Claims, 6 Drawing Sheets

Commercial flour

Water-washed gluten and starch
(15% Protein)

Ethanol-washed gluten and starch
(15% Protein)

METHODS FOR SEPARATION OF WHEAT FLOUR INTO PROTEIN AND STARCH FRACTIONS

BACKGROUND OF THE INVENTION

1. Field of the Invention

The present invention relates to methods for separation of wheat flour into protein and starch fractions. More particularly, the invention relates to methods for separation of wheat flour into protein and starch fractions wherein chilled ethanol is used as a washing fluid.

2. Description of the Art

Longstanding processing problems in the fractionation of wheat into starch and protein concentrates exist. In general, protein-from-starch separators use large amounts of water as the fractionation fluid, remove water-soluble protein, and discharge large amounts of dilute protein-bearing aqueous waste. Separators and the associated dryers use excessive energy, are capital intensive, and subject the gluten to loss of end-use functionality.

Wheat protein and starch have been separated commercially since 1835 by the Martin process. Although the Martin process is still the predominant technology (Godon et al., *Qual. Plant Foods Hum. Nutr.* 33:161 (1983)), several alternatives have been commercialized and many proposed (Fellers, In *Industrial Uses of Cereals*, Ed. Y. Pomeranz, American Association of Cereal Chemists, St. Paul, Minn., 207 (1963) and Grace, in *Proceeding of the World Congress on Vegetable Protein Utilization in Human Foods and Animal Feedstuffs*, Ed. T. H. Applewhite, American Oil Chemists' Society, Champaign, Ill., 112–115 (1989). The Martin and alternate technologies separate hydrated protein and starch particles by particle-size difference. In the Martin process, a large continuous protein and starch matrix or dough is mechanically developed after addition of water. The starch in this matrix is relatively free and not adherent to the protein matrix. Consequently, the starch falls away with the wash fluid when the dough is conveyed with continuous kneading above a porous screen, and is washed in excess water. Alternate methods include the "batter" process (Anderson et al., *Cereal Chemistry* 35:449 (1958) and *Cereal Chemistry* 37:180 (1960)) and the "centrifugal" process. These alternatives also rely on the development of a protein matrix and the separation from the small, unhydrated starch granules in excess water. The differences between methods are in the size of the protein matrix or dough and the mode of size separation. The Martin process produces a single cm to meter-sized matrix and separates protein and starch particles by selective passage of the water-conveyed starch through screens; the batter methods produce mm-sized matrices and separate by flow through screens; and the centrifugal process produces micron-sized matrices and separates by flow through centrifugal fields such as those produced in a hydrocyclone. A hydrocyclone separation process is described by Verberne et al. (U.S. Pat. No. 4,132,566). An improvement on the Martin process is described by Kerkkonen et al. (U.S. Pat. No. 3,951,938).

Alternative laboratory scale methods employing the density difference between starch and protein particles have not been commercialized. One of these methods employs exhaustive milling, control of moisture, and differential settling in a solvent solution. The solvent contained freon and a second solvent which was selected to achieve a density between that of starch and gluten (*Finley Journal of Food Science* 41:882 (1976)). Another method employed milling, dough formation, and up to an hour of centrifugation in salted water (Czuchajowska and Pomeranz, *Cereal Chemistry* 70:701 (1993)). U.S. Pat. No. 5,472,511 to Rayas et al. describes separation of proteins from grain flour to form a film-forming solution, which process involves mixing the flour with water containing ethanol at a pH which causes the proteins to be solubilized in the solution, and centrifuging the solution to separate the starch from the solution.

SUMMARY OF THE INVENTION

The present invention is directed towards methods for separation of wheat flour into protein and starch fractions while overcoming the problems associated with the prior art water washing methods. In the method of the invention, wheat flour is mixed with water to hydrate the flour and form a cohesive batter or dough. The batter or dough is chilled, and mixed and washed with chilled ethanol to separate it into protein and starch fractions.

The method produces wheat protein fractions that are equivalent in yield and protein concentration to fractions produced by water washing methods, while avoiding the disadvantages of the water washing methods. The resultant gluten protein product has altered and improved properties. Although it might be expected that ethanol would reduce the functionality of the protein, it was unexpectedly found that in tests of functionality as a wheat flour strengthening agent (farinograph test), flours fortified with protein produced in accordance with the method of the invention showed greater strength and higher quality than flours fortified with water-processed protein. Further, flour compositions prepared using the protein fraction of the invention showed a longer stability time (farinograph test) compared to commercial flour or a flour composition prepared using a protein fraction obtained using a water wash.

Physical and chemical processes during ethanol washing contribute in significantly different ways to the separation, compared to water washing. While not being bound by theory, it is suggested that there may be disruption of the protein-protein bonds and protein-lipid bonds, and there is also displacement of water from the hydrated structure.

In accordance with this discovery, it is an object of the invention to provide methods for the production of wheat and starch fractions which produce wheat protein fractions that are substantially equivalent in yield and protein concentration to fractions produced by water washing methods, while overcoming the disadvantages of the prior art water washing methods.

Another object of the invention is the provision of a wheat gluten product which can provide improved strength and stability to doughs prepared with the product.

A further object of the invention is the provision of methods for separation of wheat flour into protein and starch fractions which reduce water and energy use and reduce waste water generation and environmental impact.

A still further advantage of the invention is the inactivation of lipolytic enzymes that can lead to rancidity or development of off-flavors in oil-rich or bran-rich coproducts.

Other objects and advantages of the invention will become readily apparent from the ensuing description.

DETAILED DESCRIPTION OF THE INVENTION

Figure 1:
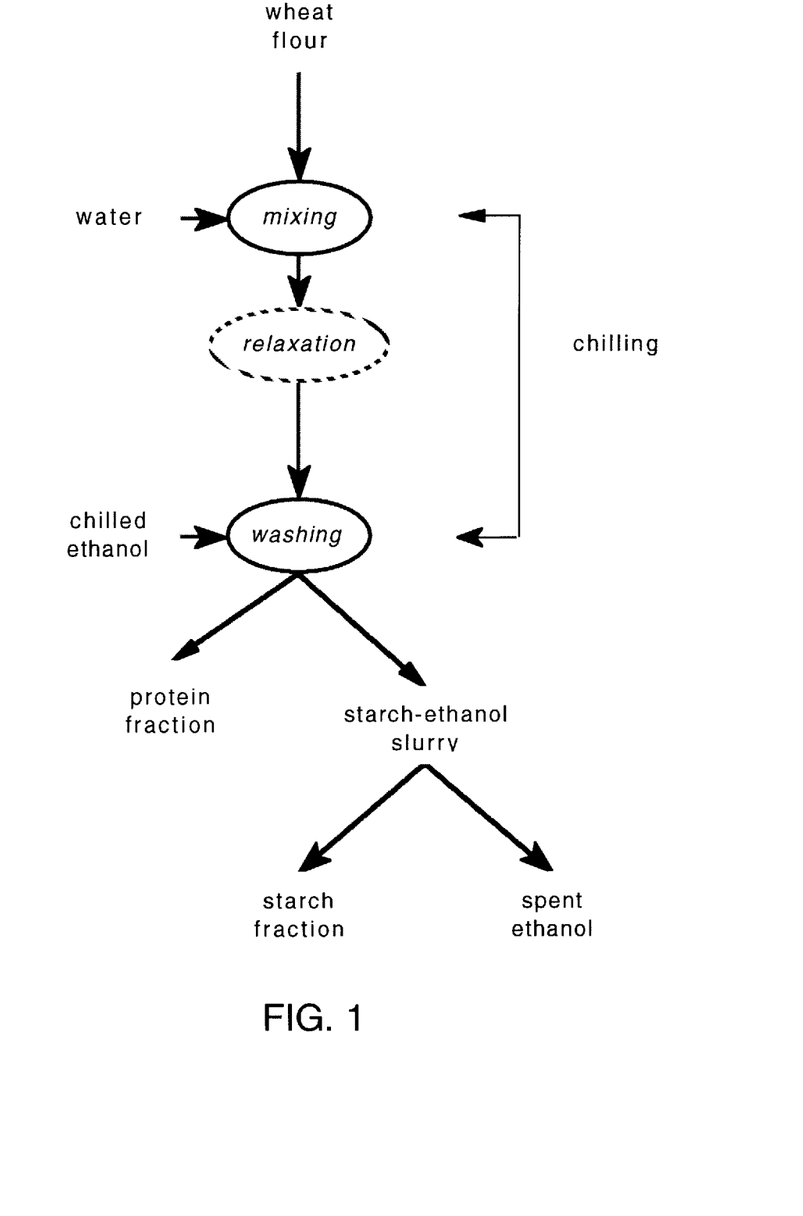
FIG. 1 illustrates the method of the invention for fractionation of wheat flour into starch-rich and protein-rich fractions.

The present invention provides methods for separating wheat flour into protein and starch fractions using chilled ethanol as a washing fluid for hydrated, chilled batter or dough. FIG. 1 illustrates the method of the invention. In brief, wheat flour is mixed with water to form a hydrated, cohesive batter or dough; the batter or dough is chilled and mixed and washed with chilled ethanol to separate it into protein and starch fractions.

In the first step, wheat flour is mixed with water in an amount sufficient to substantially fully wet or hydrate the flour but insufficient to form a suspension. The water and flour are mixed for a sufficient time to substantially hydrate the flour and to develop a cohesive batter or dough.

The batter or dough is chilled to minimize solubility of the protein in the dough during the ethanol wash step, to make the protein structure more rigid and less susceptible to degradation during the ethanol wash step, and to reduce the rate ethanol replaces water during the ethanol washing step thereby further contributing to the maintenance of the protein structure. In one embodiment of the method of the invention, chilling of the batter or dough is carried out in the water hydration and mixing step by using chilled water during this step. In another embodiment, chilling is carried out as a separate step prior to the ethanol wash step. In still a further embodiment, chilling is carried out during the ethanol wash step, for example, by flooding the surface of the batter or dough with chilled ethanol.

Optionally, the batter or dough is allowed to rest for a time sufficient to relax the batter or dough. Relaxation can assist in maintaining the protein structure during the subsequent ethanol wash step. Relaxation may be carried out before or after chilling of the batter or dough, or, alternatively, the dough may be held for a sufficient time during the chilling period to accomplish both relaxation and chilling of the batter or dough.

Next, the batter or dough is mixed and washed with chilled ethanol for a time sufficient to achieve the desired separation of the batter or dough into protein and starch fractions, that is, for a time sufficient to effect release of starch from the protein matrix while substantially maintaining the protein structure. The ethanol mixing and washing step effects generation of new surfaces of the batter or dough, displaces water with ethanol in the protein matrix, and physically removes the starch fraction from the protein fraction.

Collection of the protein and starch fractions is carried out by standard procedures. As illustrated below in the Example, the ethanol mixing and washing step is carried out in a chamber having a screen as the retentive substrate. Screen size is selected to allow passage of the starch particles released by the ethanol wash, but sufficiently small to minimize passage of the protein particles. This can readily be determined by routine experimentation. Screens of decreasing mesh size in series may also be used. The protein fraction produced during the ethanol mixing and washing step is retained on the screen, and the starch fraction is washed through the screen as a slurry in ethanol. The starch can be readily separated from the slurry by conventional means, for example, the ethanol may be evaporated or it may be removed from the starch by physical separation techniques such as filtration, centrifugation, decanting, or settling.

Where dried protein or starch fractions are desired, drying can be carried out by standard methods such as evaporation of the ethanol, for example, vacuum evaporation or evaporation in air or drying with heat. Where retention of protein bread baking functional properties is desired, drying of the protein fraction should be carried out at a temperature no higher than 65° C.

Some protein may be carried along with the wash ethanol in the starch-ethanol slurry. If desired, the protein may be separated from the starch or starch slurry by conventional methods such as filtration or dissolution of the protein, and may be combined with the protein fraction and thereby resulting in higher yields. The ethanol-based washing process of the invention could be a component of a system including ethanol manufacture from the starch fraction so that complete removal of ethanol would not be necessary.

Figure 2:
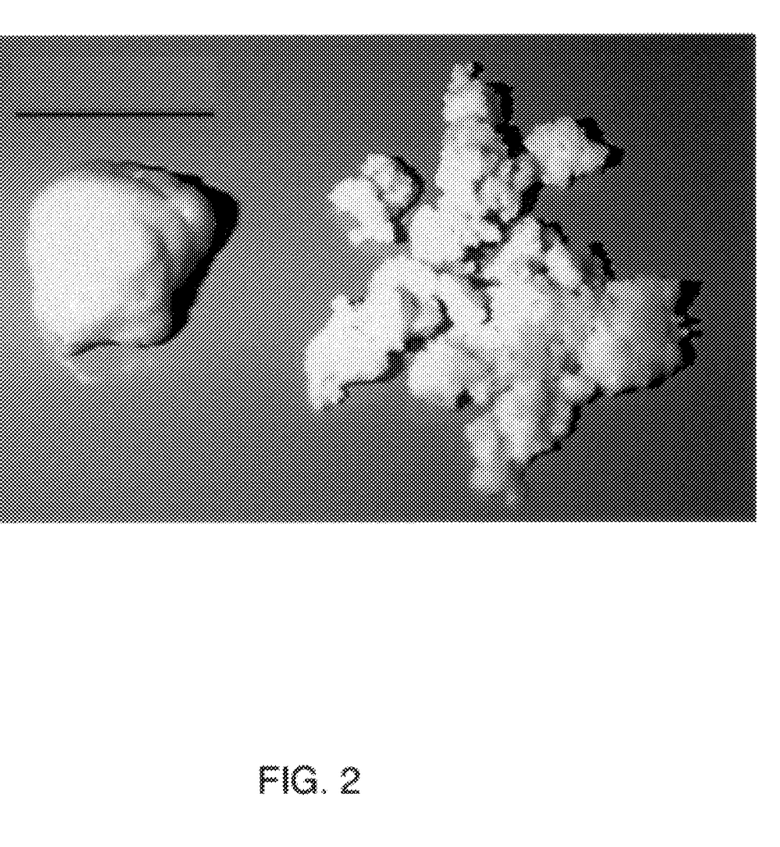
FIG. 2 is an image illustrating a wheat protein fraction prepared by washing in 90% ethanol in accordance with the method of the invention (right) compared to a protein fraction prepared by water washing not in accordance with the invention (left). Approximate protein concentration of 70%. The image includes a black 2.54 cm line.

The resultant wheat protein fraction before drying to remove any adhering ethanol or water, appears as creamy white, nonsticky, curd-like clumps as shown in FIG. 2, that dried easily. This is in contrast to protein fractions obtained by the Martin process (water washing) which produce a sticky, glutinous, cohesive mass that dries slowly. As shown in the Example, below, process parameters may be adjusted to achieve varying degrees of separation of the protein and starch. By practice of the invention, protein yields of 80% or greater and protein concentrations of 60% or greater, preferably 70% or greater, and more preferably 80% or greater protein, can be readily obtained.

Figure 3:
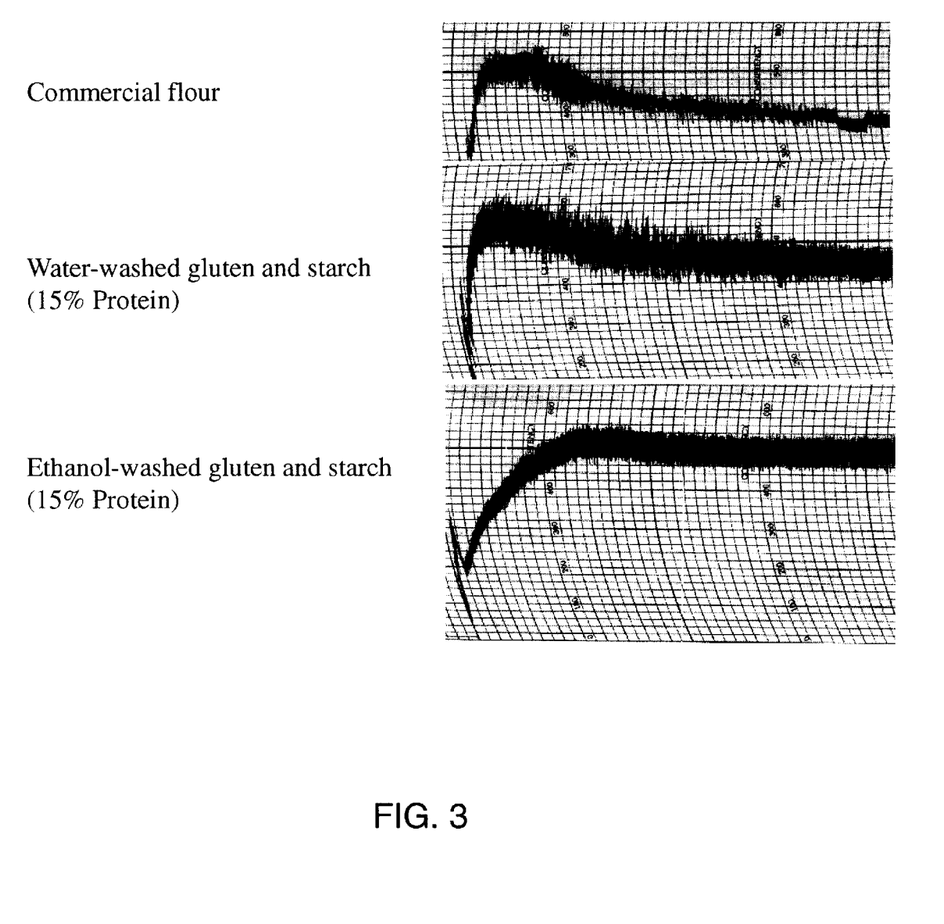
FIG. 3 is an image showing farinographs obtained from commercial flour (top graph), a synthetic flour composition prepared using a protein fraction obtained using a water wash (Martin process) and added starch to make the mixture equivalent to a commercial flour (15% protein) and water to achieve a Brabender consistency of 500 (middle graph), and a synthetic flour composition prepared using a protein fraction obtained using the method of the invention and added starch to make the mixture equivalent to a commercial flour (15% protein) and water to achieve a Brabender consistency of 500 (bottom graph). A longer stability time is obtained when protein prepared by the method of the invention is used in the flour composition.

The protein fraction has altered and improved properties. When it is dried and rehydrated, it can be used alone or as a supplement to wheat flour to provide improved dough strength and dough stability. This is illustrated in FIG. 3. As can be seen from the farinographs in FIG. 3, a flour composition prepared using protein prepared in accordance with the method of the invention shows a longer stability time than commercial flour or a flour composition prepared using protein prepared by the Martin process.

The protein fraction of the invention finds many uses, both food and non-food uses. For example, as discussed above, it can be used as the protein fraction constituent of a flour composition to improve bread baking functional properties and elastic properties. Other food uses include as a source of vital gluten or a protein concentrate to supplement texturized protein or other food products. Non-food uses include films, adhesives, or plastics.

The resultant starch fraction can be used for conventional food uses and non-food uses, e.g., cosmetics, or preparation of food or industrial starch-based products. Process Parameters: As discussed in detail in the Example, below, process parameters such as water to flour ratio (w/w) used to hydrate the wheat flour; mixing time of the hydrated flour; temperature of the process steps, and ethanol temperature and concentration, and ethanol washing time can affect the separation of the protein and starch fractions. Further, because wheat flours not only vary in their gluten content and also in the quality of the gluten, optimum separation conditions may vary from one wheat flour type to another. For any particular wheat flour or processing equipment, optimum parameters can be readily determined as described in the Example, below.

In general, we have found the following parameters suitable for the practice of the method of the invention.

Development of a hydrated, cohesive batter or dough. As discussed above, wheat flour is mixed with a sufficient amount of water and for a sufficient time to substantially hydrate the flour and develop a cohesive batter or dough. While the type of flour and temperature of the flour during mixing may affect the final separation, in general, an acceptable separation factor can be achieved for a water to flour ratio (w/w) in the range of about 0.6:1 to 1.1:1. The water and flour are mixed for a sufficient time to hydrate the flour and to develop a cohesive batter or dough. In general, on a laboratory scale, this was accomplished with a mixing time in the range of about 5 to 35 minutes and preferably about 15 to 25 minutes. Mixing of the flour and water can be carried out at ambient temperature, or where it is desired to chill the batter or dough during this step, mixing may be carried out in the range below ambient to just above the freezing temperature of the batter or dough. The step of forming the hydrated intact batter or dough and chilling the batter or dough simultaneously can be conveniently carried out by using chilled water in the mixing process.

Optionally, the batter or dough is allowed to rest for a time sufficient to relax the batter or dough. Relaxation of the batter or dough maintains and may increase the cohesiveness of the batter or dough which reduces degradation of the protein matrix during the ethanol wash step. Relaxation of the batter or dough is carried out by allowing the dough to rest until it is dimensionally stable. The relaxation step may be performed before or after chilling of the batter or dough, or, alternatively, the dough may be held for a sufficient time during the chilling period to accomplish both relaxation and chilling of the batter or dough.

The batter or dough is chilled to minimize solubility of the protein in the dough during the ethanol wash step, to make the protein structure more rigid and less susceptible to degradation during the ethanol wash step, and to reduce the rate ethanol replaces water during the ethanol washing step thereby further contributing to the maintenance of the protein structure. Chilling may be carried out before, during, or after relaxation of the dough.

Chilling can be accomplished in a variety of ways, including during the hydration step, as a separate step prior to the ethanol wash step, or simultaneously with the ethanol wash step. In one embodiment of the method of the invention, chilling of the batter or dough is carried out by hydrating and mixing the wheat flour with chilled water during the initial flour hydration and mixing step. In another embodiment, chilling is carried out as a separate step prior to the ethanol wash step. Preferably, chilling is carried out to a temperature to match the temperature of the ethanol in the ethanol wash step. This decreases the heat load on the chilled ethanol during the ethanol wash step. Convenient ways to chill the batter or dough as a separate step include holding the batter or dough in a refrigerated space, contacting the batter or dough with refrigerated air or placing on a refrigerated surface. In still a further embodiment, chilling is carried out during the ethanol washing step, for example, by flooding the surface of the batter or dough with chilled ethanol.

The batter or dough is mixed and washed with chilled ethanol for a time sufficient to achieve the desired separation of the batter or dough into protein and starch fractions, that is, for a time sufficient to effect release of starch from the protein matrix while substantially maintaining the protein structure. The ethanol mixing and washing step effects generation of new surfaces of the batter or dough, displaces water with ethanol in the protein matrix to form curdlike protein pieces (see FIG. 2) and physically removes the starch fraction from the protein matrix. The ethanol wash step is accomplished using ethanol having a concentration of about 55 to 100% ethanol and preferably about 85 to 95% ethanol. The temperature range is about 0° C. to −40° C. The preferred range to achieve a separation factor ($\alpha_{p/s}$) of about 100 generally will be about −5° to −15° C. Ethanol washing is carried out for a time sufficient to effect release of starch from the protein matrix and substantially avoid breakdown of the protein. This will depend in part on the sample size and can be readily be determined by test runs, as illustrated in the Example, below.

The following example is intended only to further illustrate the invention and is not intended to limit the scope of the invention which is defined by the claims.

EXAMPLE

This example describes the method of the invention and separation of protein and starch as a function of process variables.

Materials.

Wheat flour obtained from a commercial supplier (Giusto, San Francisco, Calif.) was used in all experiments. This flour was analyzed at 14% protein (5.7× percent nitrogen). Reagent grade, 200-proof ethyl alcohol containing no denaturants was used directly or diluted with distilled water to a desired concentration.

Process Equipment and Instruments.

A temperature-controlled mixing device was used to hydrate and develop flours into batters or doughs (C. W. Brabender Micro-farinograph™, Model 8110, Duisburg, Germany). A commercial gluten-washing device was used with modifications to the screened chamber, for ethanol washing (Perten Glutomatic™, Model 2200. Modifications included the use of a polyethylene 160 micron, 39% open area, and 230-micron thick mesh over a support with its percentage open area increased by 135%. A low temperature refrigeration system with a cooling range of 32° to −80° C. was employed to maintain the temperature of the ethanol at the desired value (FTS Model MC480A1).

For comparison studies to compare the differences between water washing of the batter or dough and ethanol washing, the commercial gluten-washing device was used for water washing with no modifications to the screen.

A separation factor $\alpha_{p/s}$ was calculated as defined below:

$$\alpha_{p/s} = (X_p/X_s)_{retained}/(X_p/X_s)_{passed}$$

where $x_p$ and $x_s$ are the mass fractions of protein and starch in the fraction retained on the screen (protein-rich, or gluten fraction) or in the fraction that passed through the screen (starch-rich fraction). The separation factor was applied to assess the overall separation because it accounts simultaneously for the concentration ratios of both fractions. The separation factor is a dynamic separation factor that changes during the experiment and is not inherent or equilibrium-based.

Procedures.

The method of the invention is illustrated schematically in FIG. 1. The water hydration and mixing step was carried out using the micro-farinograph, and the ethanol washing was carried out using the Glutomatic™. The mixed dough and the ethanol wash fluid were chilled. For purposes of comparison, a procedure was carried out wherein water was used in place of ethanol as the "wash fluid." In this procedure, both the mixing of the dough and the "washing" were carried out in the Glutomatic™. The protein in the spent water wash fluid was water-soluble protein.

The steps prior to the ethanol wash were as follows: A 10.00 g (ca. 11.9±0.3% moisture) measure of flour was mixed in the micro-farinograph at 25° C. for one minute. Water was added slowly (0.3 ml/sec or 18 ml/min) and thoroughly blended for the time shown in Table 1. The dough or batter was relaxed at 25° C. for 10 minutes, and then remixed for 5 seconds to redistribute water that appeared on the surface. The sample was then chilled at rest for 23 minutes in the farinograph (bath set at −10° C.) until the batter reached 10° C. After 2 seconds of mixing to combine any surface condensation or accumulation of moisture, the batter was weighed and transferred to the Glutomatic™ washing chamber.

Ethanol washing was conducted as follows: After the batter was placed in the washing chamber, the mixing action and fluid washing pump were initiated and maintained for up to 160 seconds. Delivery rate of the ethanol wash fluid was 50 ml/min. The protein fraction was retained on the screen, and the starch fraction was washed through the screen as a starch-ethanol slurry.

To assess the separation factor for each test run, the wash slurry with starch was collected in a series of weighing dishes during the wash period. Collected starch slurry samples (starch and conveying wash fluid) were evaporated to dryness. Gluten (protein fraction) samples were dried on a Perten Glutork™ gluten drier. Starch samples were air dried and then oven dried at 100° C. for 2 hours. Sample mass was recorded and the sample subsampled for nitrogen analysis employing the LECO™ Nitrogen Determinator. The nitrogen contained in the retained or gluten fraction (protein fraction) was computed by material balance from the nitrogen value for the starch-rich fraction which passed through the screen with ethanol washing.

Test variables were evaluated and all other parameters held constant. Table 1, below, defines ranges of variables examined.

TABLE 1

Value of parameters for each tested parameter

| Tested parameter | Hydration (g water/ g flour) | Mixing Time (min) | Temperature of ethanol wash (°C.) | Ethanol content in wash (% v) |
|---|---|---|---|---|
| Hydration of flour | 0.6 to 1.0 | 5.0 | −7 ± 2 | 90 |
| Mixing time of flour | 0.9 | 0.5 to 45 | −7 ± 2 | 90 |
| Temperature of wash | 0.9 | 25 | −35 to 40 | 90 |
| Ethanol content | 0.9 | 25 | −13.2 ± 2 | 55 to 100 |

Results.

Hydration and Development of the Protein Matrix. Identification of appropriate conditions of flour hydration and mixing time raised the value of the process separation factor from 1 for no hydration (and no separation) to 30 for hydration and 110 for mixing.

Figure 4:
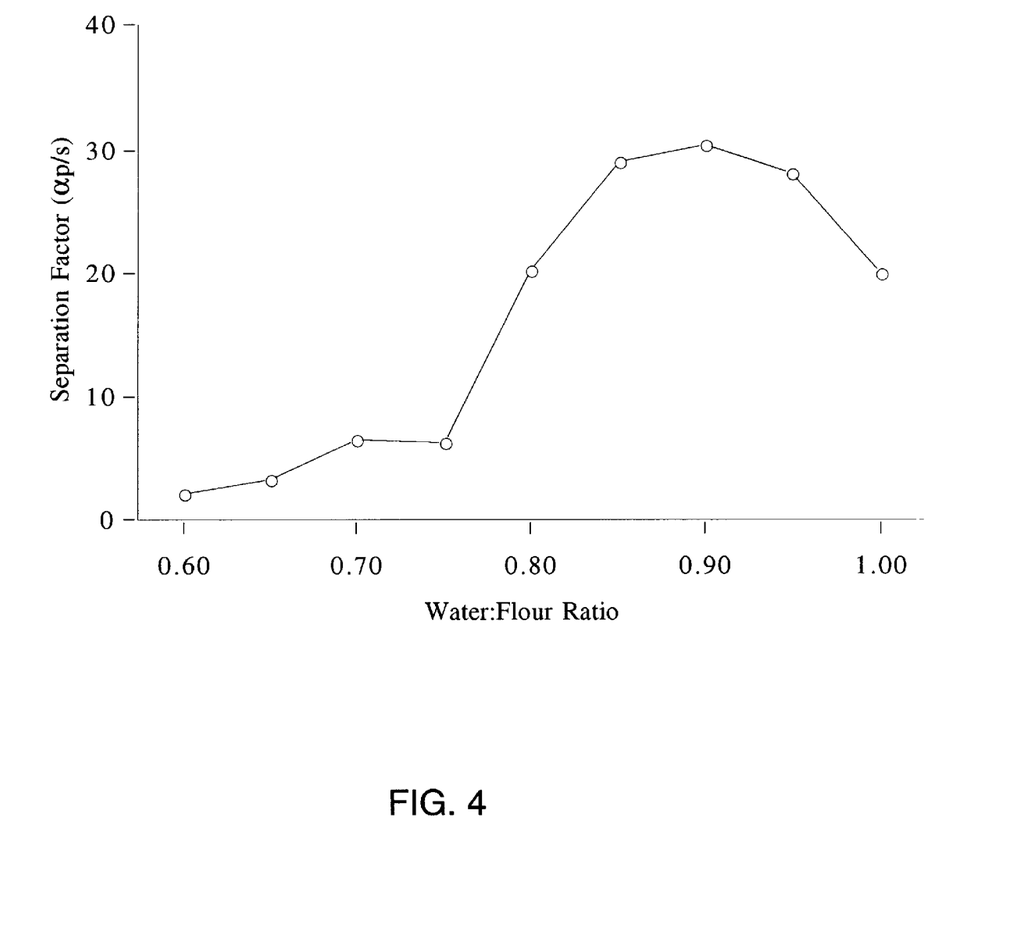
FIG. 4 shows the influence of hydration on the process separation factor ($\alpha_{p/s}$). The water hydration and mixing step was carried out at 25° C., and the ethanol mixing and washing step was carried out for 80 seconds.

In the hydration experiments, the separation factor plateau was reached at an 80 seconds ethanol wash. At this time, separation factors of 30 were obtained for hydrations of 0.85 to 0.95 water-to-flour mass ratio (FIG. 4). When hydration was less than 0.80, separation factors less than 20 were obtained. When hydration was greater than 0.95, the separation factor also decreased suggesting a loss of matrix cohesiveness and the passage of protein. The hydration at which the most effective separations were achieved was greater than the hydration at which the dough would be considered to be mobile, which is at a water-to-flour mass ratio of at least 0.43, and is also in the range of hydration (0.7 to 1.8) reported for batter development in the batter process.

Figure 5:
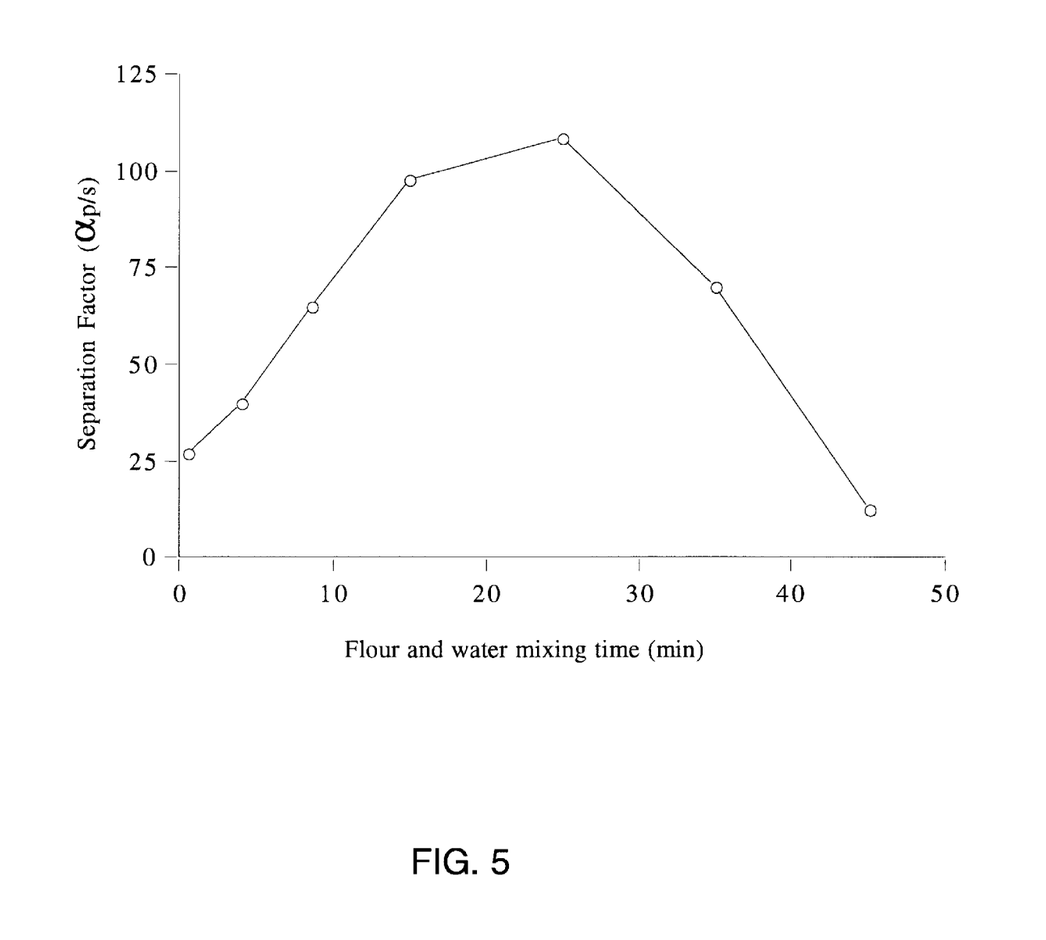
FIG. 5 shows the influence of the time of mixing of the water and flour on the process separation factor. The water hydration and mixing step was carried out at 25° C., and the ethanol mixing and washing step was carried out for 80 seconds.

Mixing time was found to be an important factor for optimum separation, since too long or too short a mixing period reduced the separation factor for the process. Separation factor data for various mixing times for optimally hydrated flour (Table 1, row 2) reached the separation factor plateau after 80 seconds of ethanol wash. The 80 second data are shown in FIG. 5 where a separation factor of 100–110 is shown for mixing times of 15 to 25 minutes. With more than 45 minutes of mixing, the matrix became mechanically degraded and would not support effective separation.

Protein concentration in the protein fraction reached nearly 70% in the region of the best separation factor, but was reduced to 53% and 40% for the shortest and longest times applied.

Figure 6:
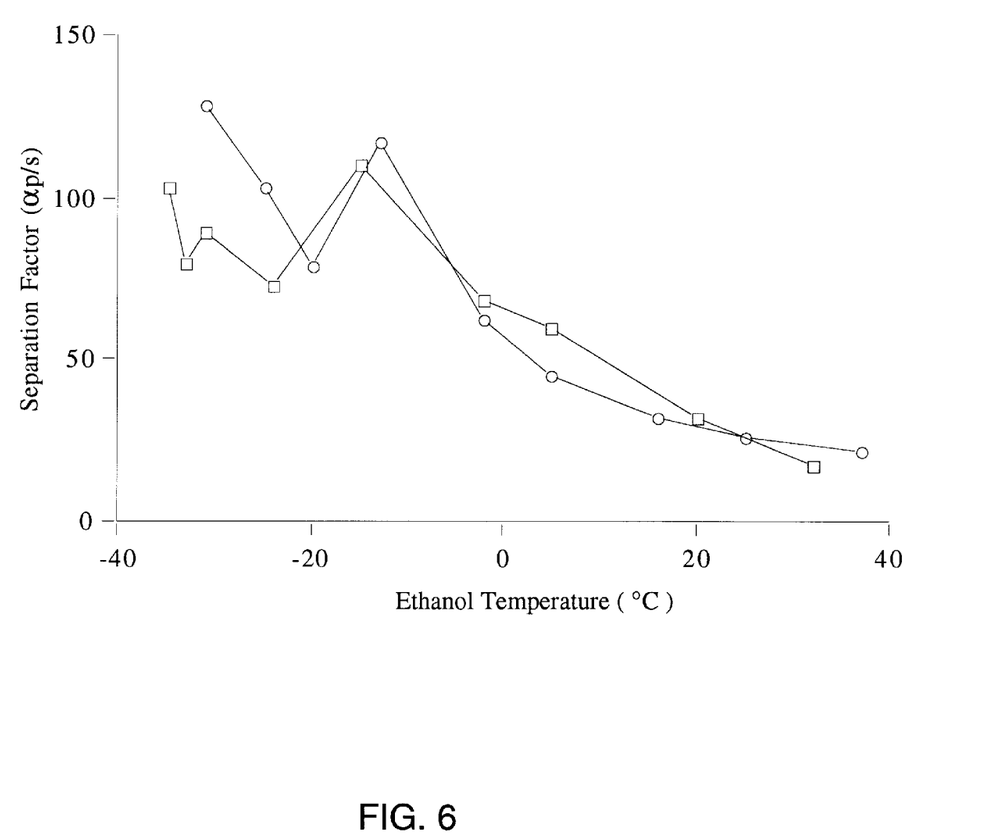
FIG. 6 shows the role of ethanol temperature on the net process separation factor for an ethanol wash. Two trials are shown.

Ethanol Wash Step. Control of temperature resulted in a separation factor as high as 120. When hydrated and mixed batters were washed in 90% ethanol (Table 1, row 3), the separation factor increased with declining temperature to about 120 at −15° C. (FIG. 6).

When wheat flour batters were washed in ethanol at 85% or greater concentration, a pattern of separation factor stability after about 40–60 seconds was obtained (Table 1, row 4).

The physical form of the gluten or protein fraction produced by ethanol washing differed from that obtained by water washing. Generally, the ethanol-washed protein fraction had lowered cohesiveness and broke into smaller curd-like clumps than water-washed gluten (FIG. 2, right). The protein fraction from ethanol wash was also less sticky and dried more rapidly than the water washed gluten. The ethanol concentration data revealed that the physical form of the protein varies somewhat based on the water content of the ethanol wash. It was "slippery" at 55% ethanol wash, resilient "curds" at 90% ethanol, or non-resilient "tough" or "fibrous" curds at 100% ethanol.

Fractionation Dynamics. Table 2 shows the protein yield and concentrations in protein fractions in the ethanol washed protein fractions. For comparison purposes, data is included in Table 2 for protein fractions obtained wherein a water wash is used in place of the ethanol wash step.

TABLE 2

Protein yield and concentrations in ethanol and water-washed protein fractions at the end of separation.

| End Point Reached (Y[1] or N) | Washing fluid ethanol (E) and water (W) (vol %) | Time (s) | Yield protein (%) | Concentration (%N X 5.7) |
|---|---|---|---|---|
| Y | 100W[2] | 280 | 80 | 90.3 |
| N | 100W[2] | 60 | 90 | 26 |
| Y | 100W with 3% NaCl$_2$ | 3600 | 77–86 | 72–80 |
| N | 55E/45W | 120 | 87.6 | 86.7 |
| N | 65E/35W | 120 | 85.8 | 84.2 |

TABLE 2-continued

Protein yield and concentrations in ethanol and water-washed protein fractions at the end of separation.

| End Point Reached ($Y^1$ or N) | Washing fluid ethanol (E) and water (W) (vol %) | Time (s) | Yield protein (%) | Concentration (%N X 5.7) |
| --- | --- | --- | --- | --- |
| N | 70E/30W | 120 | 83 | 82.6 |
| N | 75E/25W | 120 | 81.5 | 79.7 |
| Y | 80E/20W | 80 | 85.8 | 77.2 |
| Y | 85E/15W | 80 | 82.9 | 76.3 |
| Y | 90E/10W | 60 | 84.9 | 68.3 |
| Y | 95E/05W | 60 | 84.2 | 66.7 |
| Y | 100E | 60 | 81.2 | 63.4 |

[1]Washing was stopped when the mechanical mixing limitation of the device was reached.
[2]Not in accordance with the invention. For comparison purposes only.

As can be seen from the data in Table 2, an important characteristic of ethanol wash step is the great speed with which the ethanol wash achieves release of starch. Mass yields were essentially stable and at near peak values after about 60 seconds of washing in ethanol. Comparable values for laboratory scale water washing required about 280 seconds. Comparable values for a pilot Martin-based washer required on the order of 3600 seconds (Godon et al., supra). Protein Yield and Concentration. A progressive loss of protein in the ethanol washed gluten (and gain in the starch fraction) was observed, which was proportional not only to the length of time of exposure to the wash fluid but also to the concentration of ethanol.

Protein yield and protein concentration when separation is at a plateau or a maximum (Table 2) ranged from 81% (63.4% protein) to 88% (87% protein) depending on the concentration of the ethanol washing fluid. This compares to 80% (90.3% protein) for the water wash in the Glutomatic™ using the manufacturer's recommended washing period (300 seconds) and to 77–86% (72–80% protein) for the pilot Martin process using a 3% salt solution and a 3600 second washing period (Godon et al., supra). If the gluten in the water wash is assayed when the ethanol wash is complete, e.g., 60 seconds, the yield is 90% (26% protein) reflecting a slower release of starch.

There was less than a 10% difference in the yield of protein over the range of ethanol concentrations examined, but more than a 33% change in the protein concentration. The lowest protein concentration was for the most concentrated ethanol. The reduced yield for washing in highly concentrated ethanol was caused by several factors, including the failure of the device to continue manipulation and creation of surface, more rapid loss of cohesiveness, and losses of protein through the screen (the ethanol wash used a 160 μm versus the standard 88 μm screen).

It is understood that the foregoing detailed description is given merely by way of illustration and that modifications and variations may be made therein without departing from the spirit and scope of the invention.

What is claimed is:

1. A method for separating wheat flour into protein and starch fractions, which comprises:
   (1) mixing wheat flour with a sufficient amount of water and for a sufficient time to hydrate the flour and form a cohesive batter or dough;
   (2) chilling the batter or dough; and
   (3) mixing and washing the batter or dough with chilled ethanol to separate it into protein and starch fractions.

2. The method of claim 1 wherein chilling of the batter or dough is carried out during the mixing and hydrating of the flour.

3. The method of claim 1 wherein the chilling of the batter or dough is carried out as a separate step prior to mixing and washing the batter or dough with chilled ethanol.

4. The method of claim 1 wherein the chilling of the batter or dough is carried out simultaneously with the mixing and washing with chilled ethanol.

5. The method of claim 1, which further includes resting the batter or dough for a time sufficient to relax the batter or dough.

6. The method of claim 5, wherein relaxing of the batter or dough is carried out before, simultaneously with, or after chilling of the batter or dough.

7. The method of claim 1 which further includes drying the separated protein fraction.

8. The method of claim 1, wherein the separated starch fraction is obtained as a starch-ethanol slurry.

9. The method of claim 8, which further includes separating the starch fraction from the starch-ethanol slurry.

10. The method of claim 9, which further includes drying the starch fraction.

11. In a method for separating wheat flour into protein and starch fractions, wherein the wheat flour is mixed into a hydrated, cohesive dough or batter, the improvement comprising:
   chilling the hydrated, cohesive batter or dough and washing the batter or dough with chilled ethanol to separate it into protein and starch fractions.

12. A wheat protein fraction obtained by the steps of:
   (1) mixing wheat flour with a sufficient amount of water and for a sufficient time to hydrate the flour and form a cohesive batter or dough;
   (2) chilling the batter or dough;
   (3) mixing and washing the batter or dough with chilled ethanol to separate it into protein and starch fractions to obtain a separated protein fraction.

13. The protein fraction of claim 12 which is dried.

14. A composition comprising the wheat protein fraction of claim 13.

15. The composition of claim 14 which further includes added starch or flour.

16. A composition comprising the wheat protein fraction of claim 12.

* * * * *